United States Patent
Montag

(10) Patent No.: US 8,031,199 B2
(45) Date of Patent: Oct. 4, 2011

(54) SYSTEM AND METHOD FOR INTERFACING GRAPHICAL INFORMATION WITH AN INFORMATION HANDLING SYSTEM WIRELESS TRANSCEIVER

(75) Inventor: Bruce Montag, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 964 days.

(21) Appl. No.: 11/756,053

(22) Filed: May 31, 2007

(65) Prior Publication Data

US 2008/0297520 A1    Dec. 4, 2008

(51) Int. Cl.
   G06F 13/14    (2006.01)
   G06F 15/00    (2006.01)
   G06T 1/00     (2006.01)
(52) U.S. Cl. ......................................... 345/520; 345/501
(58) Field of Classification Search .................. 345/501, 345/519, 520; 340/538.15; 455/556.1
   See application file for complete search history.

(56) References Cited

U.S. PATENT DOCUMENTS

| | | | |
|---|---|---|---|
| 2003/0027517 A1* | 2/2003 | Callway et al. | 455/3.01 |
| 2003/0079919 A1* | 5/2003 | Hochmuth et al. | 178/18.01 |
| 2004/0100975 A1* | 5/2004 | Kreiner et al. | 370/401 |
| 2005/0289631 A1 | 12/2005 | Shoemake | 725/118 |
| 2006/0132492 A1* | 6/2006 | Cantin | 345/519 |
| 2007/0262973 A1* | 11/2007 | Wan | 345/204 |
| 2008/0273602 A1* | 11/2008 | Glen | 375/257 |

\* cited by examiner

*Primary Examiner* — Kee M Tung
*Assistant Examiner* — Jacinta M Crawford
(74) *Attorney, Agent, or Firm* — Hamilton & Terrile, LLP; Robert W. Holland

(57) ABSTRACT

Wireless communication of display information between an information handling system and display is supported by a direct connection between a graphics system of the information handling system and a transceiver of the information handling system. For example, the graphics system outputs pixel level display information through a cable directly to the transceiver. A converter on the transceiver converts the display information to network information, such as from a DisplayPort format to a PCI Express format, so the transceiver can send the display information through a wireless network, such as a personal area network, to the display. A display module located at the transceiver coordinates initiation of communication of display information from the graphics system to the display.

7 Claims, 5 Drawing Sheets

SYSTEM AND METHOD FOR INTERFACING GRAPHICAL INFORMATION WITH AN INFORMATION HANDLING SYSTEM WIRELESS TRANSCEIVER

BACKGROUND OF THE INVENTION

1. Field of the Invention

The present invention relates in general to the field of information handling system networks, and more particularly to a system and method for interfacing graphical information with an information handling system wireless transceiver.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A typical desktop information handling system typically interacts with a variety of peripheral devices, such as a keyboard, display, speakers, a printer, a scanner, a camera, external drives, etc. . . . Portable information handling systems also interact with the same types of peripherals, sometimes directly and sometimes through a "cradle" device. Often cable connections to peripherals create a confusing and unsightly mess. One solution that reduces or eliminates the need for cables is the use of a personal area network (PAN) supported with high bandwidth transceivers, such as Ultrawide band (UWB) radio technology or 60 GHz radio technology. A PAN typically uses short range wireless communication, such as around 3 to 60 GHz, that has a relatively large bandwidth so that peripherals, typically located within a close proximity of the information handling system, communicate with the information handling system wirelessly instead of through cables. Currently, high bandwidth transceivers, such as UWB radio technology, supports bandwidth of approximately 480 Mbs, however, recent advances have made speeds in the Gbs range achievable. As bandwidth has increased, wireless connections between information handling systems and displays have become possible.

A difficulty with using a wireless PAN to interface a monitor and an information handling system is that presentation of visual information at high resolution displays typically requires considerable bandwidth, usually through a dedicated cable, such as a VGA, DVI, HDMI or DisplayPort cable. To address this difficulty, a WirelessHD industry group has recently formed to attempt to standardize 60 GHz millimeter wave technology for short range wireless HDTV connectivity. Other groups have sought to extend UWB technology into multiple spectrum band groups between 3 and 15 GHz for delivery of gigabit payloads over short ranges. In order to natively drive 1080P HDTV formats, 3 Gbps of bandwidth is typically needed between the graphics processor unit (GPU) and the display. Although bandwidth of 3 Gbps will support WUXGA display monitors, greater bandwidths are generally needed for display monitors having greater resolutions, such as 6 Gbps typically required to drive a WQXGA display monitor. As wireless PAN capabilities expand to bandwidths sufficient to communicate native display information, other bottlenecks may occur. For example, communication of information from a graphics processor to the wireless transceiver potentially will absorb significant information handling system resources. For instance, a PCI Express lane provides 2.5 Gbps, not quite enough to support HDTV connectivity, and the follow-on PCI Express generation 2 supports 5 Gbps, not quite enough to natively drive a WQXGA display monitor.

SUMMARY OF THE INVENTION

Therefore a need has arisen for a system and method which interfaces a graphical processor and wireless transceiver to natively drive a display over a wireless interface.

In accordance with the present invention, a system and method are provided which substantially reduce the disadvantages and problems associated with previous methods and systems for communicating visual information over a wireless interface. Display information rendered by an information handling system graphics system is communicated through a direct connection to a transceiver of the information handling system for transmission through a wireless network to a display.

More specifically, an information handling system graphics system outputs DisplayPort display information for communication to a display. A direct connection from the graphics system, such as DisplayPort cable, communicates the display information in the graphics system format to a transceiver of the information handling system. A converter at the transceiver converts the display information to a network format, such as PCI Express, for communication by the transceiver to a display though a wireless network, such as a PAN. The transceiver also supports other PAN functions, such as wireless USB or Bluetooth, for information communicated to the transceiver from the chipset of the information handling system. A display module associated with the transceiver coordinates initiation of presentation of information at a display by retrieving the display EDID and forwarding the EDID and an output request to the graphics system.

The present invention provides a number of important technical advantages. One example of an important technical advantage is that a single high bandwidth radio configuration is provided for an information handling system PAN functions, including Bluetooth, wireless USB and wireless display. A cross over cable connection between the graphics system and the transceiver enables wireless display capability for desktop or portable information handling systems. For example, a DisplayPort link layer associated with the graphics system efficiently supports either a wired or wireless connection through the use a single display output port. The use of a common port for wired or wireless connections enables a faster transition time to wireless display capability for the graphics system. The cross over cable may be implemented whether the DisplayPort transmitter is a discrete part or integrated within the graphics system. Direct transceiver driver to graphics drive communication is avoided, thus enabling the graphics system to efficiently switch output PHs based on radio connection status.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system communicates display information through a wireless PAN for presentation at a display. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
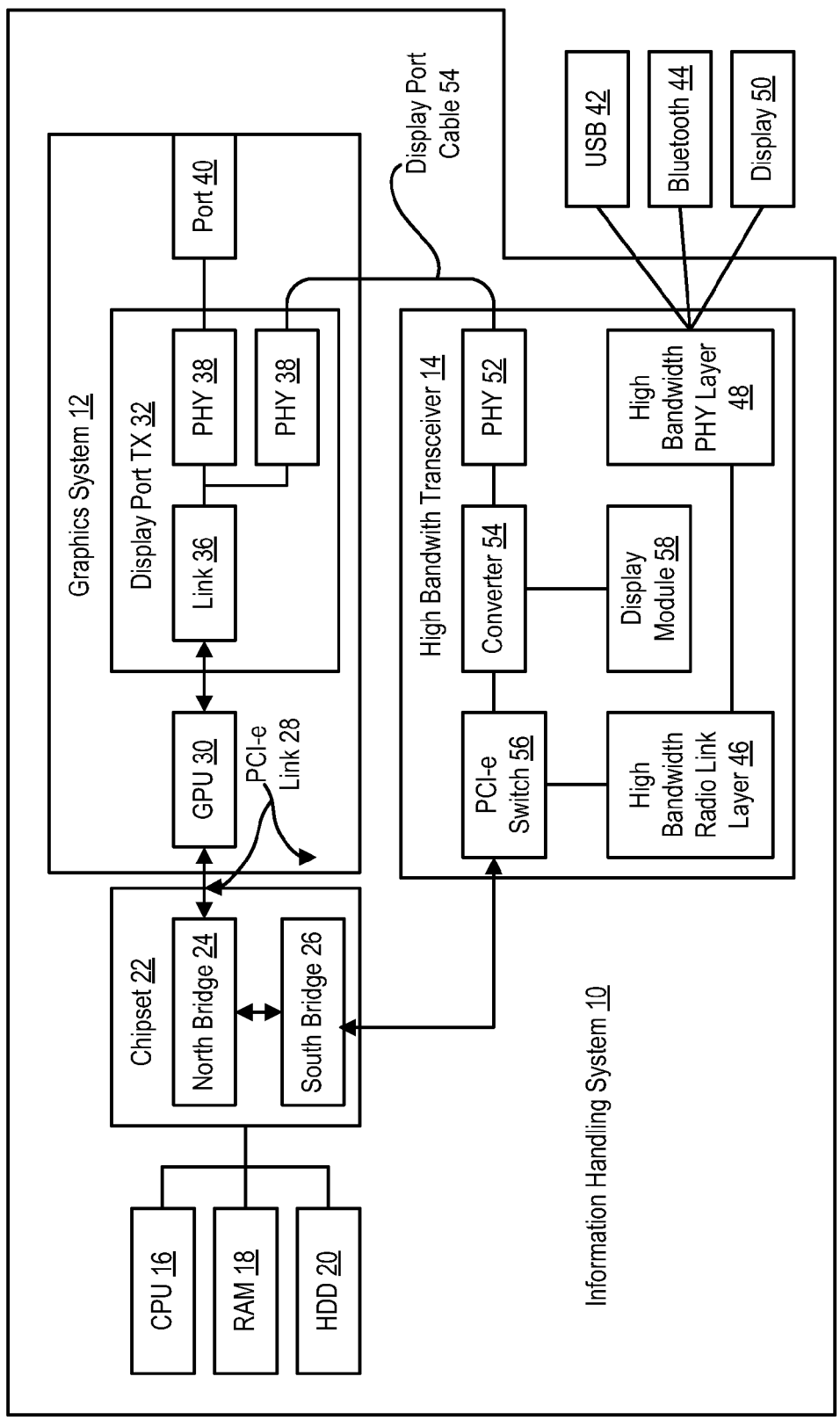
FIG. 1 depicts a block diagram of an information handling system having a graphics system directly connected to a transceiver.

Referring now to FIG. 1, a block diagram depicts an information handling system 10 having a graphics system 12 directly connected to a transceiver 14. Information handling system 10 has plural processing components that cooperate to generate visual information for presentation at a display, such as a CPU 16, RAM 18, hard disk drive (HDD) 20 and chipset 22. Information communicated to chipset 22 is forwarded to graphics system 12 through a north bridge 24 and to transceiver 14 through a south bridge 26, such as through a PCI Express link 28. Graphics system 12 has a graphics processor unit (GPU) 30 that renders the visual information into display information that quantifies pixel values for presentation of visual images at a display. GPU 30 provides the pixel value display information to a DisplayPort transmitter 32 having a link 36 and physical interfaces 38 that transmit the display information to a display, such as through a port 40. Transceiver 14 is a high bandwidth transceiver, such as Ultra Wide Band (UWB) or 60 GHz transceivers, that transmit radio waves to carry information from south bridge 26 to wireless devices through a wireless network, such as USB devices 42 or Bluetooth devices 44, using a high bandwidth radio link layer 46 and high bandwidth PHY layer 48.

In order to wirelessly transmit display information from DisplayPort transmitter 32 to a display 50, PHY 38 of DisplayPort transmitter 32 couples directly to transceiver 14 through a PHY 52, such as through a DisplayPort cable 54. The direct connection provided by cable 54 communicates pixel level information in the DisplayPort packets without processing between PHY 38 and PHY 52 so that no latency is introduced by the communication of the display information from graphics system 12 to transceiver 14. At transceiver 14, the display information passes from PHY 52 to a converter 54 for conversion to the network format used by the high bandwidth transceiver PAN, such as PCI Express. Once converted to the PCI Express format, the display information proceeds to a PCI Express switch 56 for communication to display 50. A display module 58 included with transceiver 14 coordinates the initiation of wireless communication between display 50 and graphics system 12, such as by acting as an intermediary between graphics system 12 and display 50. For example, display module 58 monitors the wireless network to determine when a display 50 interfaces with the network, gathers EDID information for the display to receive display information, and provides the EDID information and an output request to graphics system 12.

Figure 2:
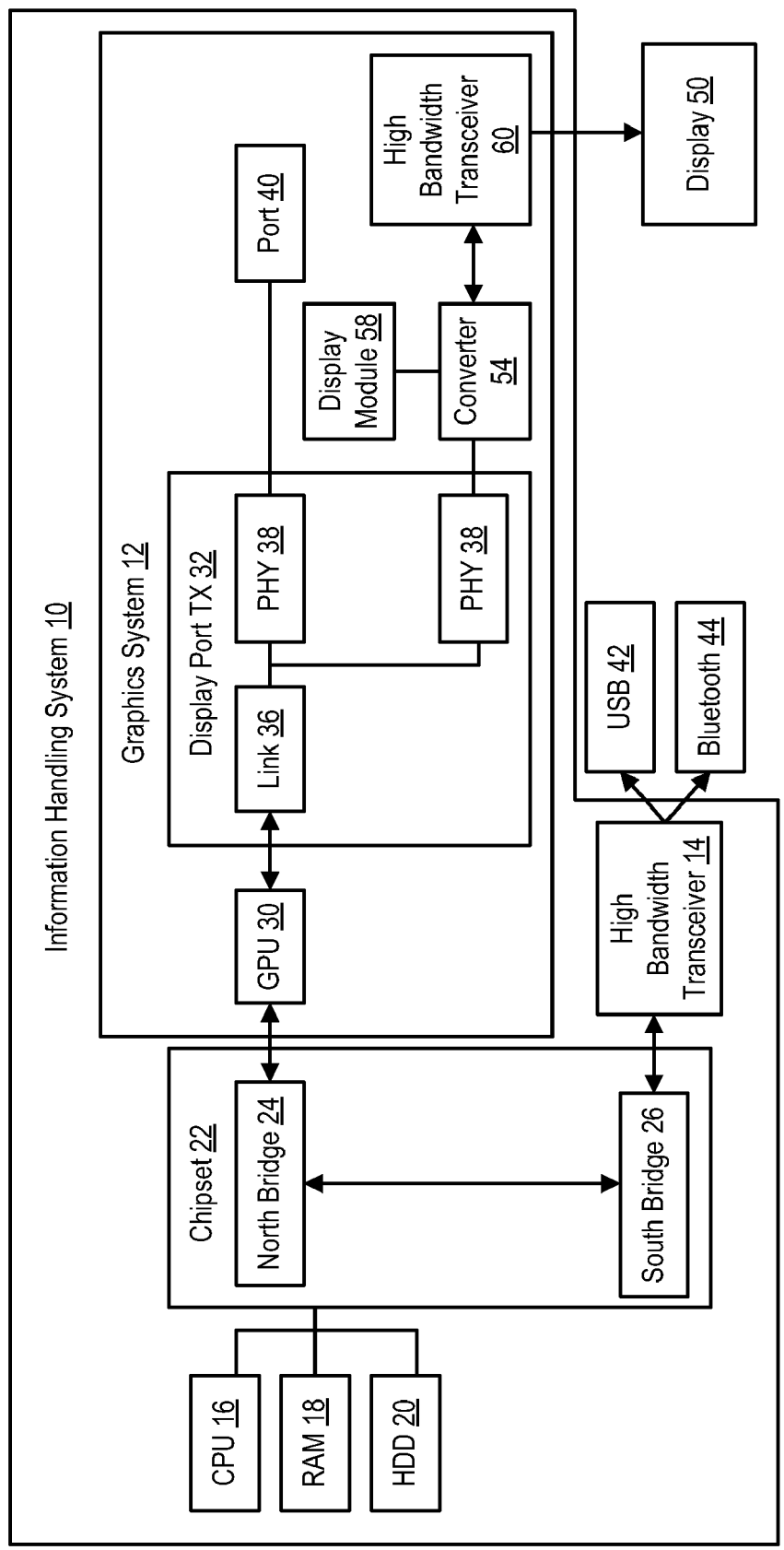
FIG. 2 depicts a block diagram of an information handling system having a transceiver located at the graphics system to support communication of display information.

Referring now to FIG. 2, a block diagram depicts an information handling system 10 having a transceiver 60 located at the graphics system 12 to support wireless communication of display information. DisplayPort transmitter 32 receives display information rendered by GPU 30 and forwards the display information in DisplayPort packets to a converter 54. Converter 54 converts the display information from the format used by graphics system 12, such as DisplayPort packets, to a format used by the high bandwidth transceiver PAN interfaced with a display 50, such as PCI Express. The converted display information is forwarded to a transceiver 60 included in graphics system 12, which communicates the display information through the high bandwidth transceiver PAN to display 50. Communication between graphics system 12 and display 50 is coordinated with display module 58. A separate transceiver 14 supports a separate high bandwidth transceiver PAN to communicate with USB devices 42 and Bluetooth devices 44. Integration of a transceiver 60 within graphics system 12 supports wireless communication of display information without introducing substantial latency, however, the use of separate transceivers 60 and 14 tends to increase the cost of the system. In one embodiment, this difficulty is addressed by having a single transceiver integrated with the graphics system that also accepts other PAN information, such as USB or Bluetooth. For example, USB or Bluetooth information is sent through the chipset and GPU for communication to wireless devices with the transceiver integrated into the graphics system. Alternatively, a direct connection communicates the USB or Bluetooth information from their source to the graphics system transceiver.

Figure 3:
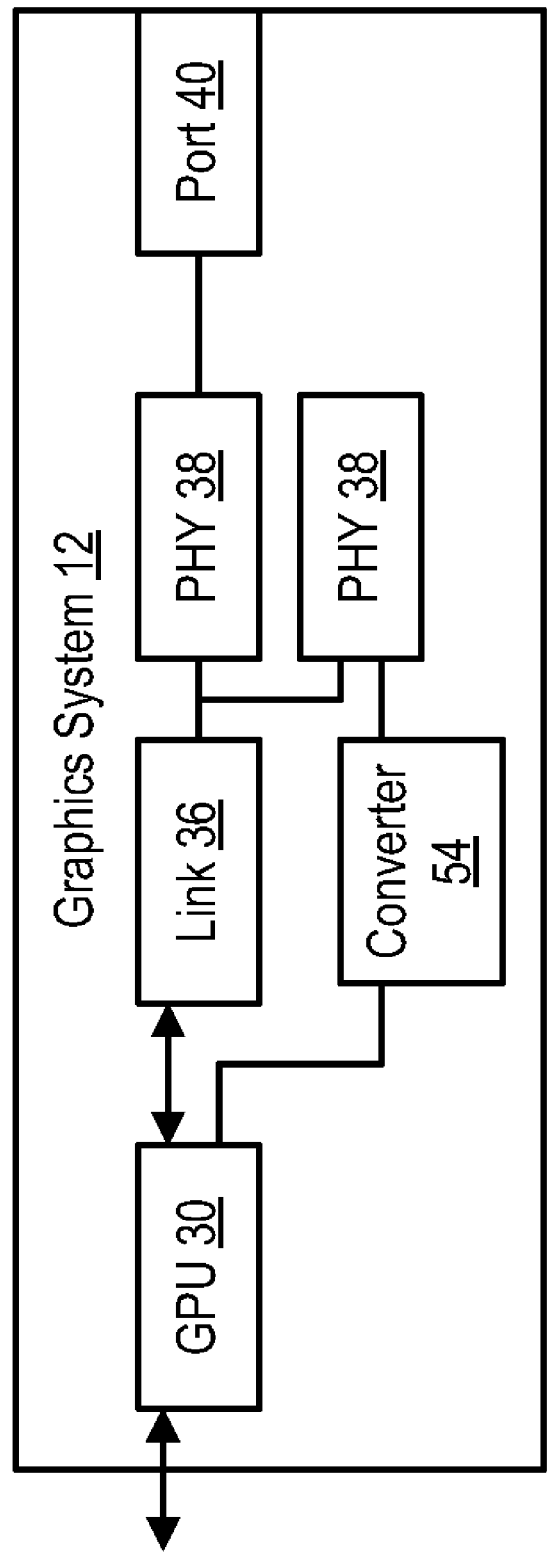
FIG. 3 depicts a block diagram of a graphics system having display information forwarded to a transceiver through an internal bus.

Referring now to FIG. 3, a block diagram depicts a graphics system 12 having display information forwarded to a transceiver through an internal bus. When wireless communication of display information is desired, GPU 30 generates the display information for transfer to link 36 and PHY 38. At PHY 38, the display information is provided to converter 54 for conversion from the graphics format, such as DisplayPort packets, to the wireless network format, such as PCI Express. The converted display information proceeds back through GPU 30 for communication through internal links of the information handling system to a transceiver for communication to a display. Transfer of display information to the transceiver through the information handling system chipset eliminates the need for a cable connection as depicted by FIG. 1 or a dedicated graphics system transceiver as depicted by FIG. 2; however, this introduces additional processing of the display information at the GPU and chipset that creates bandwidth and latency demands on internal link components, such as the chipset and the PCI Express link used to transfer information from GPU 30 to transceiver 14.

Figure 4:
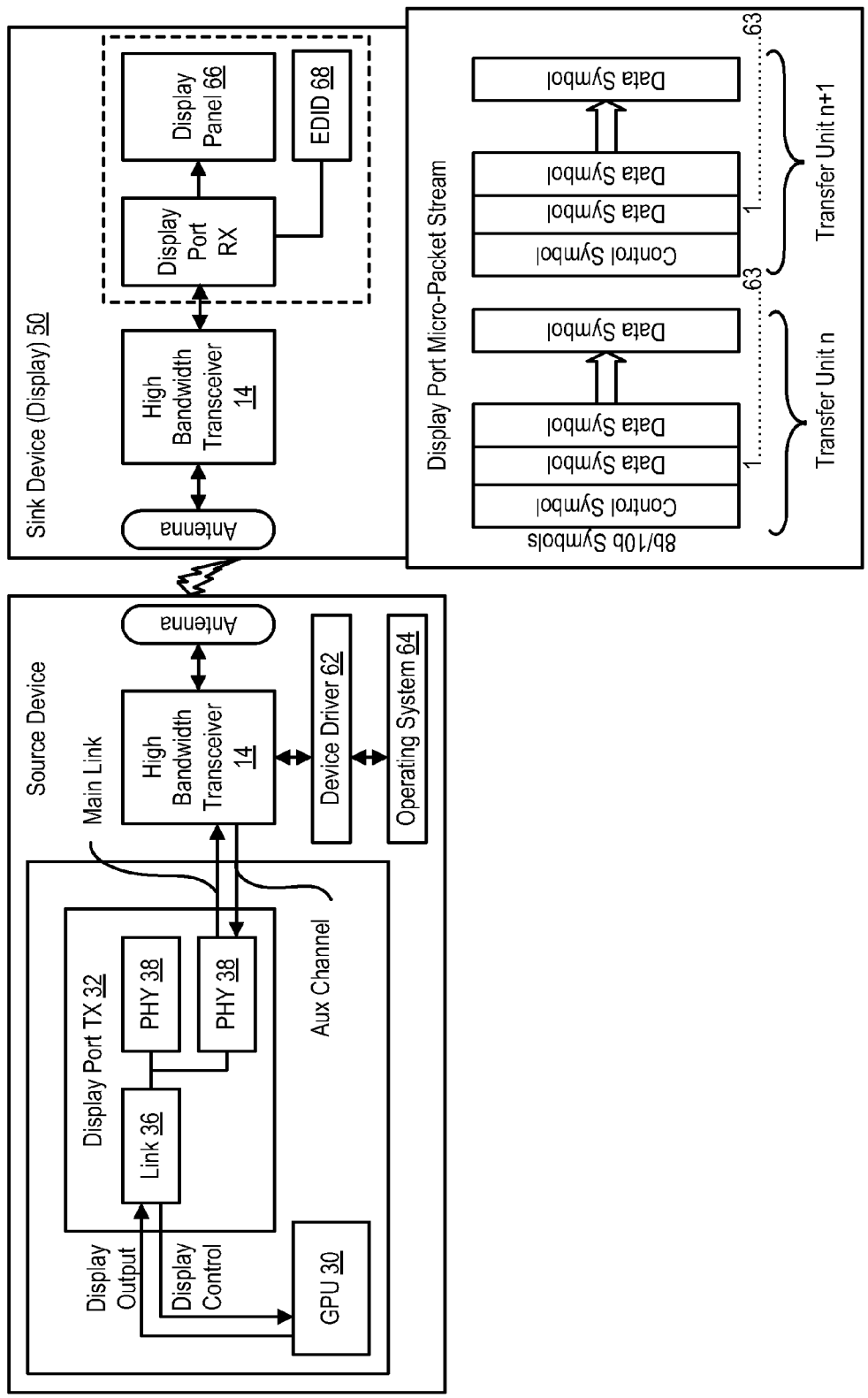
FIG. 4 depicts a block diagram of an information handling system wirelessly communicating display information.

Referring now to FIG. 4, a block diagram depicts an information handling system 10 wirelessly communicating display information. Graphics system 12 communicates the display information to a transceiver 14 for communication over a PAN. Transceiver 14 operates under the management of a driver 62 for an operating system 64. The display information is received at a transceiver 14 located at display 50 for presentation as visual images at a display panel 66. Transceiver driver 62 coordinates initiation of wireless transmission of display information by requesting EDID 68 stored on display 50. Transceiver driver 62 provides EDID 68 and an output request to graphics system 12 by acting as an intermediary between display 50 and graphics system 12. Graphics system 12 adjusts the display information output to the PHY associated with wireless transmission. The adjustment from output at a port to output to transceiver 14 may be performed through a PHY-Link port on the graphics system or a PHY layer to a common Link layer. With communication of EDID 68 and the output request by transceiver 14, driver 62 informs operating system 64 of an output transition to wireless communication of the display information. Graphics system 12 transitions to wireless communication of display information and the display information is forwarded by transceiver 14 to display 50.

Figure 5:
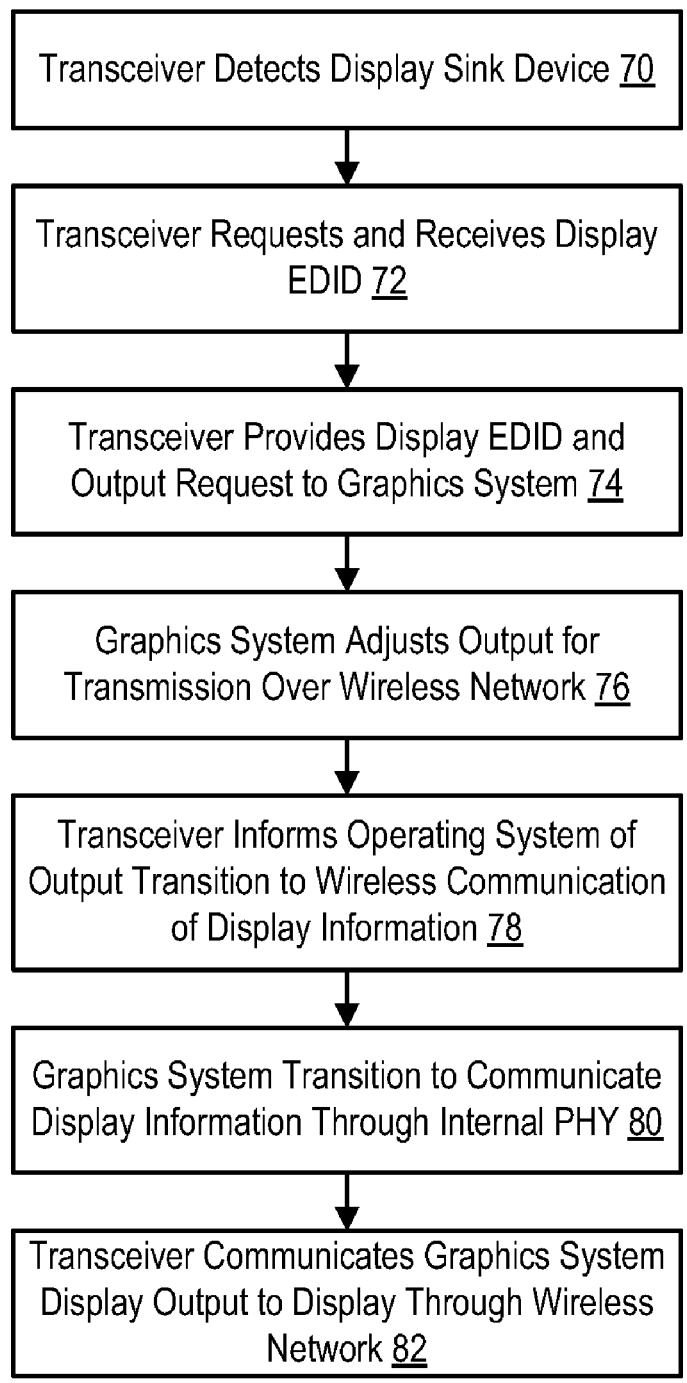
FIG. 5 depicts a flow diagram of a process for coordinating communication of display information through a transceiver.

Referring now to FIG. 5, a flow diagram depicts a process for coordinating communication of display information through a transceiver. The process begins at step 70 with detection by the information handling system transceiver of a display sink device interfaced though a PAN. At step 72, the transceiver requests and receives EDID from the display sink device. At step 74, the transceiver provides the display EDID and an output request to the graphics system of the information handling system. At step 76, the graphics system adjusts its output for transmission to the wireless network, such as by changing from output at a cable port PHY to output at a transceiver PHY. At step 78, the transceiver informs the operating system of the output transition to wireless communication of the display information. At step 80, the graphics system transitions to communicate the display information through the internal PHY. At step 80, the transceiver communicates the graphics system display output to the display through the wireless network for presentation of the display information at the display.

Although the present invention has been described in detail, it should be understood that various changes, substitutions and alterations can be made hereto without departing from the spirit and scope of the invention as defined by the appended claims.

What is claimed is:

1. A method for interfacing an information handling system and a display, the method comprising:
   rendering display information at an information handling system graphics system in a display format;
   communicating the display information through a connector and a cable to a transceiver, the display information communicated through the cable in the display format;
   communicating the display information with the transceiver to a display through a wireless network;
   obtaining identification information from the display with the transceiver;
   forwarding the identification information and an output request from the transceiver to the graphics system through an auxiliary link of the connector; and
   initiating display information from the graphics system to the transceiver in response to the identification information and output request.

2. The method of claim 1 wherein communicating the display information through a connector further comprises communicating the display information directly from the graphics system to the transceiver without additional processing of the display information.

3. The method of claim 2 wherein communicating the display information directly further comprises communicating the display information through a PHY-Link port on the graphics system.

4. The method of claim 2 wherein communicating the display information directly further comprises communicating the display information through a PHY layer to a common Link layer.

5. The method of claim 1 further comprising:
   receiving the display information at the transceiver in a graphics system format; and
   converting the display information at the transceiver into a transceiver format.

6. The method of claim 5 wherein the graphics system format comprises DisplayPort and the transceiver format comprises PCI Express.

7. The method of claim 1 wherein communicating the display information through a connector to a transceiver further comprises communicating the display information through a DisplayPort cable.

* * * * *